US012051211B2

(12) United States Patent
Qian et al.

(10) Patent No.: US 12,051,211 B2
(45) Date of Patent: Jul. 30, 2024

(54) MOVING TARGET FOCUSING METHOD AND SYSTEM BASED ON GENERATIVE ADVERSARIAL NETWORK

(71) Applicants: University of Electronic Science and Technology of China, Chengdu (CN); Yangtze Delta Region Institute (Huzhou), University of Electronic Science and Technology of China, Huzhou (CN)

(72) Inventors: Jiang Qian, Chengdu (CN); Haitao Lyu, Xinyang (CN); Junzheng Jiang, Guilin (CN); Minfeng Xing, Chengdu (CN)

(73) Assignees: University of Electronic Science and Technology of China, Chengdu (CN); Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 159 days.

(21) Appl. No.: 17/989,453

(22) Filed: Nov. 17, 2022

(65) Prior Publication Data

US 2023/0162373 A1 May 25, 2023

(30) Foreign Application Priority Data

Nov. 19, 2021 (CN) .......................... 202111398967.6

(51) Int. Cl.
 *G06K 9/00* (2022.01)
 *G06T 7/20* (2017.01)
(52) U.S. Cl.
 CPC ...... *G06T 7/20* (2013.01); *G06T 2207/20081* (2013.01)

(58) Field of Classification Search
 CPC . G06T 2207/20084; G06T 2207/20081; G06T 5/73; G01S 7/417
 See application file for complete search history.

(56) References Cited

U.S. PATENT DOCUMENTS

| 2008/0240607 A1* | 10/2008 | Sun ........................... G06T 5/73 |
| | | 382/275 |
| 2018/0144465 A1* | 5/2018 | Hsieh ........................ G06N 3/04 |

(Continued)

OTHER PUBLICATIONS

CNIPA, Notification of First Office Action for CN202111398967.6, Nov. 20, 2023.

(Continued)

*Primary Examiner* — Hadi Akhavannik
(74) *Attorney, Agent, or Firm* — Zhigang Ma

(57) ABSTRACT

A moving target focusing method and system based on a generative adversarial network are provided. The method includes: generating, using a Range Doppler algorithm, a two-dimensional image including at least one defocused moving target, as a training sample; generating at least one ideal Gaussian point in a position of at least one center of the at least one defocused moving target in the two-dimensional image, to generate a training label; constructing the generative adversarial network, the generative adversarial network includes a generative network and a discrimination network; inputting the training sample and the training label into the generative adversarial network to perform repeated training until an output of the generative network reaches a preset condition, to thereby obtain a trained network model; and inputting a testing sample into the trained network model, to output a moving target focused image.

3 Claims, 14 Drawing Sheets

(56) References Cited

U.S. PATENT DOCUMENTS

2018/0293711 A1* 10/2018 Vogels .................... G06F 17/10
2019/0035078 A1* 1/2019 Zaharchuk ................ G06T 5/70
2019/0295302 A1* 9/2019 Fu .......................... G06T 11/00

OTHER PUBLICATIONS

Yangtze River Delta Research Institute (Huzhou) of University of Electronic Science and Technology of China, and University of Electronic Science and Technology of China (Applicants), Reply to Notification of First Office Action for CN202111398967.6, w/ (allowed) replacement claims, Nov. 23, 2023.
CNIPA, Notification to grant patent right for invention in CN202111398967.6, Nov. 30, 2023.

* cited by examiner

MOVING TARGET FOCUSING METHOD AND SYSTEM BASED ON GENERATIVE ADVERSARIAL NETWORK

TECHNICAL FIELD

The disclosure relates to a field of moving target focusing technology, and in particular to a moving target focusing method and system based on a generative adversarial network.

BACKGROUND

In order to achieve focusing moving targets in Synthetic Aperture Radar (SAR) images, a traditional method is to estimate motion parameters of the moving targets, to complete a range migration correction of the moving targets by an estimated range velocity, and to construct an azimuth-matching filter function by an estimated azimuth velocity, thereby to complete the moving target focusing.

Conventional moving target imaging algorithms require estimation of the parameters for each of the moving targets before focusing. When there are multiple moving targets and each of the moving targets has different velocities, these moving targets need to be processed separately, which is a tedious process.

SUMMARY

In view of the above, the disclosure aims to provide a moving target focusing method and system based on a generative adversarial network. The focusing method uses the generative adversarial network to achieve focusing of at least one defocused moving target in an SAR image.

In order to achieve the above objectives, the disclosure provides technical solutions as follows.

The disclosure provides the moving target focusing method based on a generative adversarial network, including the following steps: generating a two-dimensional image including at least one defocused moving target by a Range Doppler algorithm as a training sample and generating a training label with at least one ideal Gaussian point corresponding to the at least one defocused moving target at a center of the at least one defocused moving target; constructing the generative adversarial network, which includes a generative network and a discrimination network; inputting the training sample to the generative network, to generate a generated image similar to the training label; inputting the generated image and the training label into the discrimination network, to obtain a discrimination result, and returning the discrimination result to the generative network; inputting the training sample and the training label into the generative adversarial network to perform repeated training until an output of the generative network reaches a preset condition, to thereby obtain a trained network model; and inputting a testing sample into the trained network model, to output a moving target focused image.

In an embodiment of the disclosure, the discrimination network is a multi-layered convolution network.

In an embodiment of the disclosure, the training label is a noiseless image with the at least one ideal Gaussian point.

In an embodiment of the disclosure, the generative network is a Unet network based on a residual structure; the residual structure includes a convolution residual block and an identity residual block; the convolution residual block is configured to adjust a size and a channel number of a feature diagram; and the identity residual block is configured to increase a depth of the generative network.

In an embodiment of the disclosure, the convolution residual block includes three three-layered structures; the three three-layered structures include a first three-layered structure, a second three-layered structure, and a third three-layered structure stacked in sequence, each of the three three-layered structures includes a convolution layer, a batch normalization and an activation function stacked in sequence; the convolution residual block further includes a two-layered structure, and the two-layered structure includes a convolution layer and a batch normalization stacked in sequence; an input end of the convolution layer of the two-layered structure is connected to an input end of the first three-layered structure, and an output end of the batch normalization of the two-layered structure is connected between the batch normalization of the third three-layered structure and the activation function of the third three-layered structure, such which is configured to form a skip connection; the convolution residual block is configured to adjust the size and the channel number of the feature diagram and to prevent gradient disappearance or gradient explosion caused by that the depth of the generative network is oversized.

In an embodiment of the disclosure, the identity residual block includes two three-layered structures; the two three-layered structures include a first three-layered structure and a second three-layered structure stacked one another; each of the two three-layered structure includes a convolution layer, a batch normalization, and an activation function; an input end of the first three-layered structure is connected between the batch normalization of the second three-layered structure and the activation function of the second three-layered structure, such which is configured to form a skip connection; the identity residual block is configured to increase the depth of the generative network and to prevent gradient disappearance or gradient explosion caused by that the depth of the generative network is oversized.

In an embodiment of the disclosure, the generative network includes a down-sampling structure, an up-sampling structure, and a connection structure for connecting a feature diagram of the down-sampling structure and a feature diagram of the up-sampling structure; and the down-sampling structure includes a residual block, and the residual block is used for down-sampling.

In an embodiment of the disclosure, the discrimination network includes five convolution layers, three batch normalizations and four rectified linear unit (relu) activation functions, and an output of a last convolution layer of the five convolution layers is input into a sigmoid function.

The moving target focusing system based on a generative adversarial network provided by the disclosure includes a memory, a processor and a computer program stored in the memory and executable by the processor, and the processor implements the moving target focusing method described above upon executing the computer program.

Beneficial effects of the disclosure are as follows.

According to the moving target focusing method and the system thereof based on the generative adversarial network provided by the disclosure, a two-dimensional image including the defocused moving targets is generated by the Range Doppler algorithm as a training sample; a training label with the ideal Gaussian points at the centers of the defocused moving targets is generated; a generated image close to the training label is obtained by the generative adversarial network; a discrimination result is obtained through the discrimination network, and returned to the generative network; the training sample and the training label are input into the generative adversarial network to perform repeated training until an output of the generative network reaches a preset condition, to thereby obtain a trained network model; and a moving target focused image is output by using the trained network model.

Compared with the conventional SAR moving target imaging algorithms, the method of the disclosure avoids the estimation of parameters for each of the moving targets followed by the range migration correction and the azimuth-matching filter separately. And the method of the disclosure can directly process the multiple defocused moving targets into well-focused targets at the same time.

In a traditional SAR data processing method, both of noise elimination and target focusing are required to be performed separately. The method of the disclosure can achieve the moving target focusing while eliminating noise through a trained network model, which achieves noise elimination and target focusing simultaneously.

Other advantages, objects and features of the disclosure will to some extent be set forth in the subsequent specification and to some extent will be apparent to those skilled in the related art based on an examination of the following research or can be taught from the practice of the disclosure. The objects and other advantages of the disclosure may be realized and obtained by the following specification.

BRIEF DESCRIPTION OF DRAWINGS

In order to make the objectives, technical solutions and beneficial effects of the disclosure clearer, the disclosure provides following attached drawings for description.

DETAILED DESCRIPTION OF EMBODIMENTS

The disclosure is further described below with reference to the attached drawings and illustrated embodiments, so that those skilled in the related field may better understand and implement the disclosure, but the embodiments mentioned are not limited to the disclosure.

Figure 1:
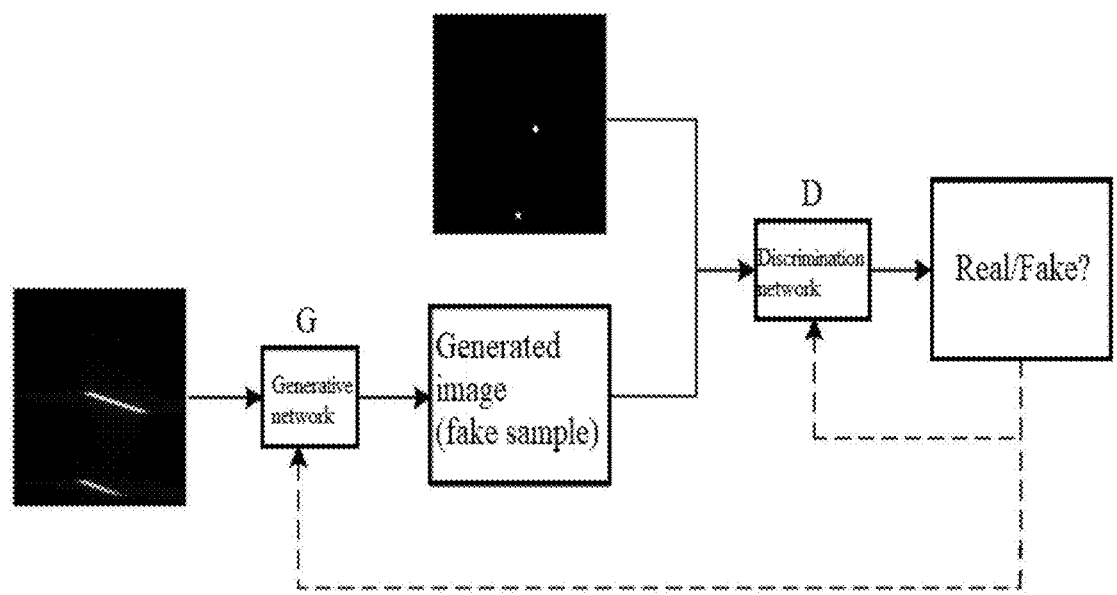
FIG. 1 illustrates a schematic structural diagram of a generative adversarial network according to an embodiment of the disclosure.

As shown in FIG. 1, the embodiment provides a moving target focusing method based on a generative adversarial network (GAN), and the method uses the generative adversarial network to achieve moving target focusing, which can realize processing multiple targets with different motion parameters simultaneously. A well-focused image for the moving targets is directly achieved from the defocused moving targets in the SAR image without the estimation of parameters. The method includes the following steps.

First, a synthetic aperture radar (SAR) image containing 1-3 defocused moving targets is simulated by Range Doppler (RD) algorithm, and the image is used as a training sample of the generative adversarial network. A training label of the generative adversarial network is obtained with 1-3 ideal Gaussian points corresponding to the 1-3 defocused moving targets at centers of the 1-3 defocused moving targets.

Then, the generative adversarial network is constructed, including a generative network and a discrimination network. The generative network is used to generate an image close to the training label to serve as an input of the discrimination network according to the input training sample.

The discrimination network is a five-layered convolutional network, and is used to determine a discrimination result, where an output of the generative network is determined as "fake", and an output of the training label is determined as "real", and the discrimination result is returned to the generative network, and a specific schematic diagram of the generative adversarial network is as shown in FIG. 1, where D represents the discrimination network, and G represents the generative network.

The specific steps of generating the training and testing data in the generative adversarial network are as follows.

A two-dimensional image for defocused moving targets is generated by the Range Doppler algorithm as an input training sample of the generative adversarial network. Each the input training sample includes 1-3 defocused moving targets that differ in range and azimuth velocity components. In order to generate a relatively obvious two-dimensional image for the defocused moving targets, a design of simulation parameters is as shown in Table 1.

TABLE 1

| Simulation parameters | |
|---|---|
| Parameter | Value |
| PRF | 800 Hz |
| Carrier waveform | 9.6 GHz |
| Platform velocity | 60 m/s |
| Platform height | 100 m |
| Target range velocity | (25 m/s-35 m/s) |
| Target azimuth velocity | (5 m/s-15 m/s) |

Figure 2A:
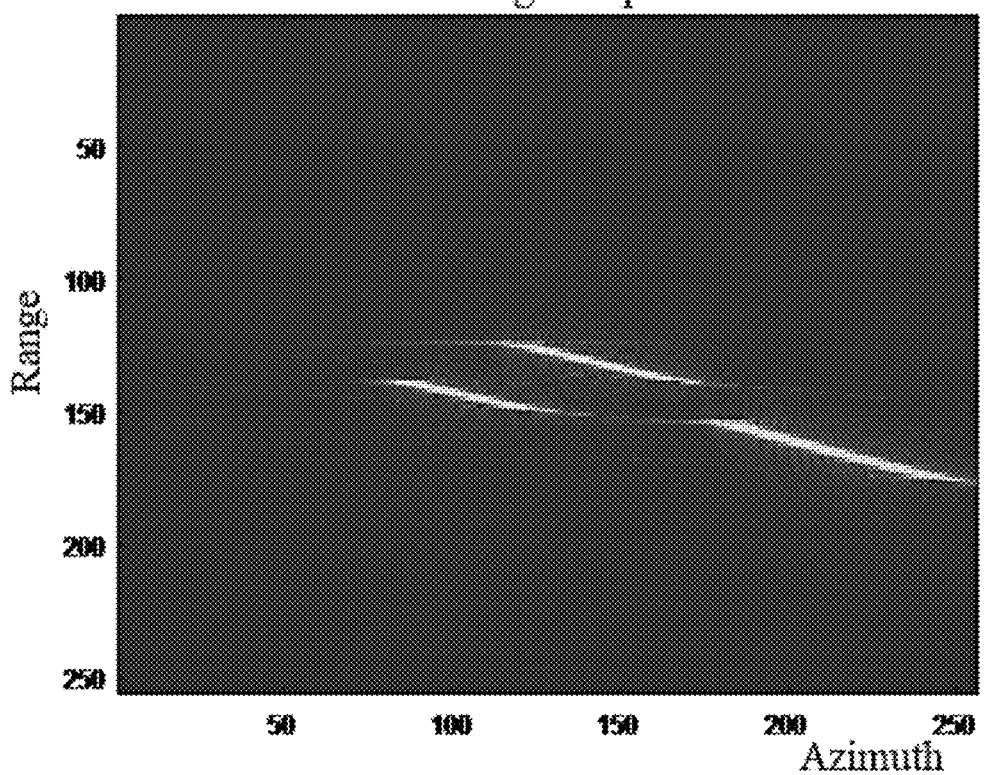
FIGS. 2A-2B show training data of a training sample according to an embodiment of the disclosure.
Figure 2B:
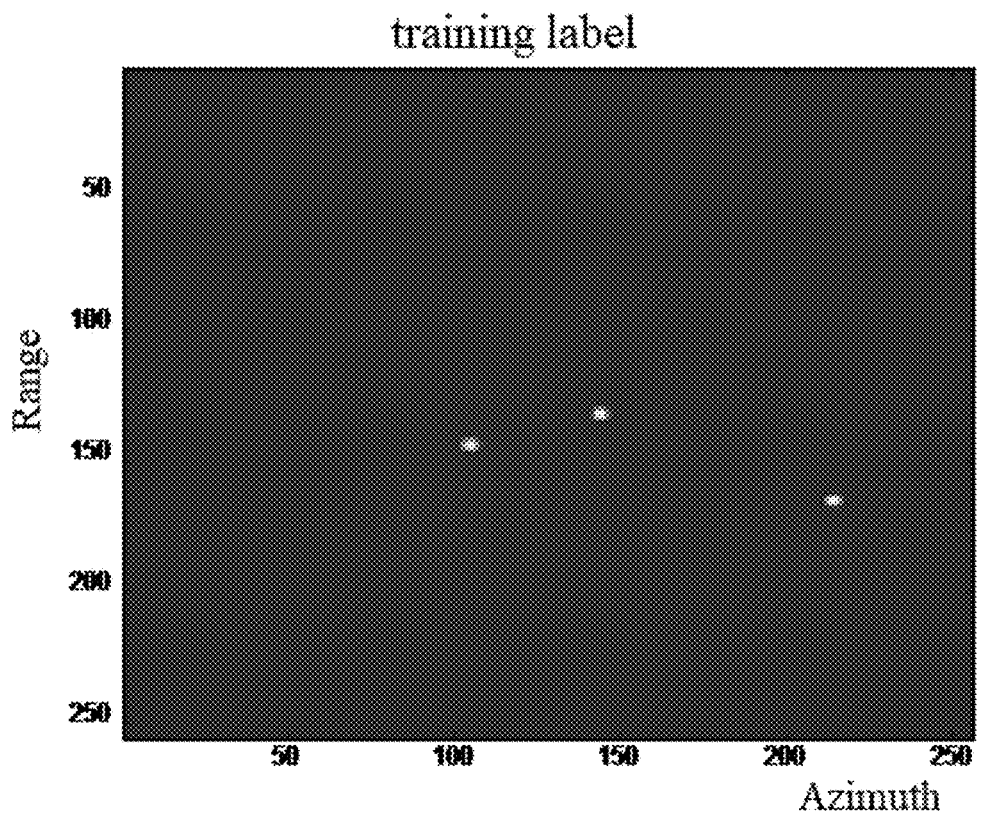

1-3 ideal Gaussian points corresponding to the 1-3 defocused moving targets are generated at the centers of the 1-3 defocused moving targets in the two-dimensional image as a training label of the generative adversarial network. Both the input training sample and the training label are converted into 256*256 matrixes to facilitate inputting a neural network for training, as shown in FIG. 2, where FIG. 2A is the training sample of the training data, and FIG. 2B is the training label of the training data.

In total, 2000 couples of training samples and labels are generated as shown in FIG. 1. Each of the 2000 input training samples is respectively added with white Gaussian noise with the SNR (referred to a signal-noise ratio) of 30 dB, 20 dB, 10 dB and 0 dB, and finally, 8000 images for the defocused moving targets with different SNR of the white Gaussian noise are obtained as the training samples of the generative adversarial network. Ideal Gaussian points without any noise are used as the training label. Data of the testing samples are generated in a consistent method with the training samples, to generate a total of 200 images for the defocused moving targets, and a random white Gaussian noise within a range from 0 dB to 30 dB is added to each of the 200 images as one of the testing samples.

A training process of the generative adversarial network is specifically as follows.

Figure 3:
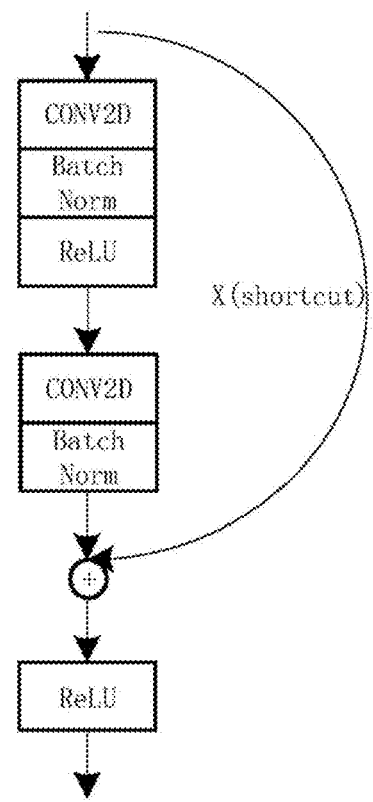
FIG. 3 illustrates a schematic structural diagram of an identity residual block according to an embodiment of the disclosure.
Figure 4:
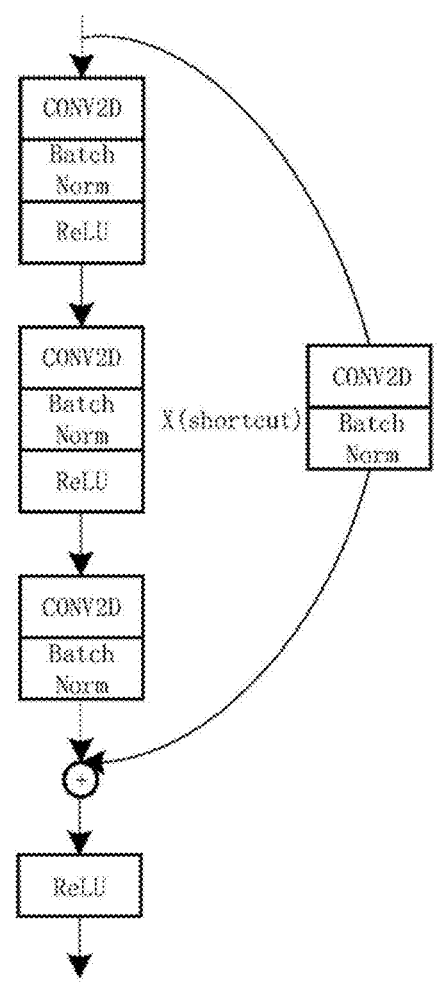
FIG. 4 illustrates a schematic structural diagram of a convolution residual block according to an embodiment of the disclosure.
Figure 5:
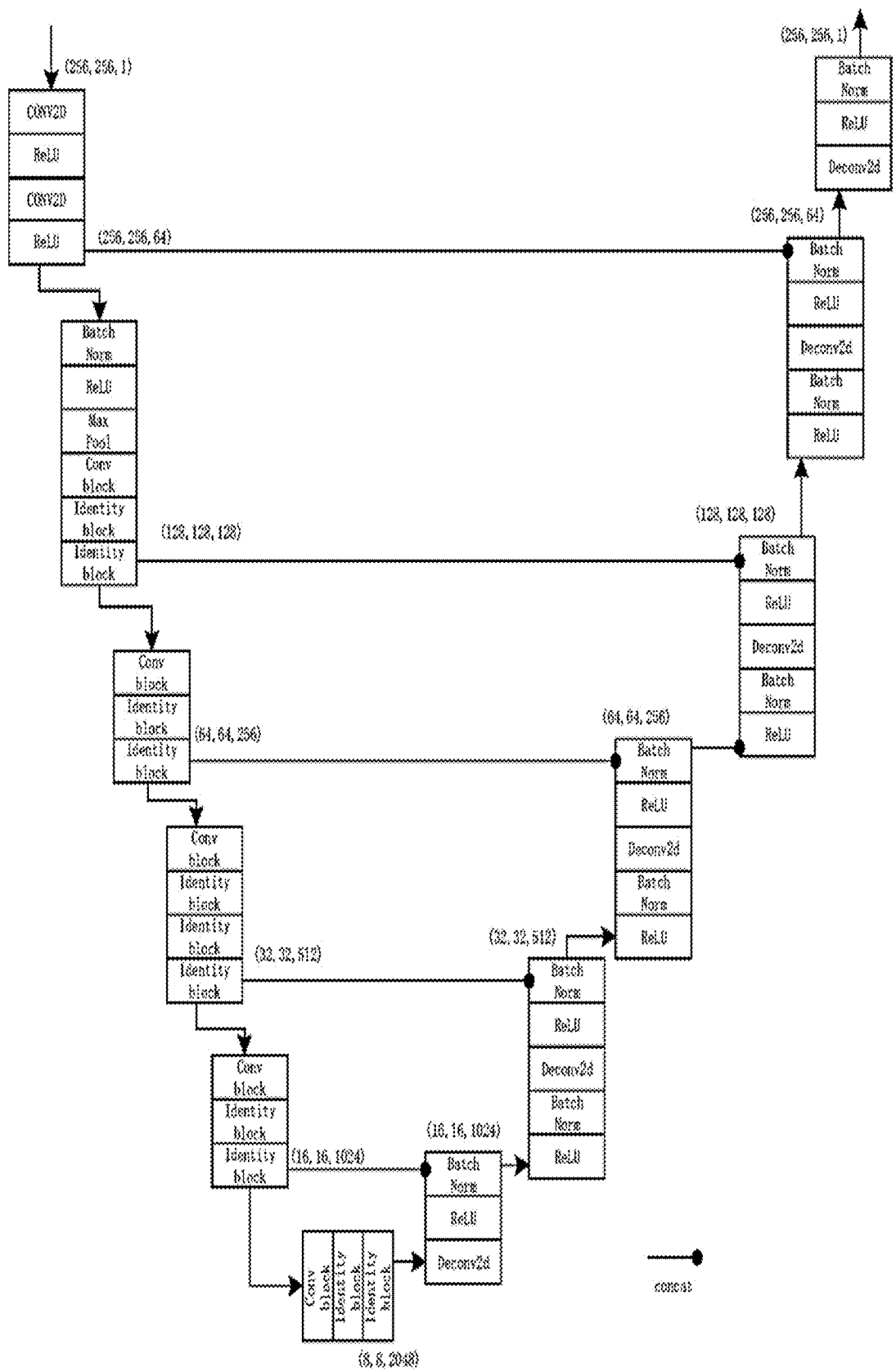
FIG. 5 illustrates a schematic structural diagram of a generative network according to an embodiment of the disclosure.

The generative network is a Unet network based on a residual structure, where the residual structure includes a convolution residual block, such as Conv_block, and an identity residual block, such as Identity_block. The convolution residual block is mainly used to adjust the size and the channel number of a feature map. The specific structures thereof are shown in FIG. 3, FIG. 4 and FIG. 5.

The convolution residual block in the embodiment includes three convolutional layers (also referred to as conv), three batch normalization layers (also referred to as batch_norm) and three activation functions (also referred to as ReLU), a second three-layered structure and a third three-layered structure stacked in sequence, where each of the three three-layered structures include a convolutional layer (also referred to as cony), a batch normalization layer (also referred to as batch_norm), and an activation functions (also referred to as relu) stacked in sequence. A two-layered structure includes a convolution layer and a batch normalization. And an input end of the convolution layer of the two-layered structure is connected to an input end of the first three-layered structure, and an output end of the batch normalization of the two-layered structure is connected between the batch normalization of the third three-layered structure and the relu activation function of the third three-layered structure, such which is regarded as a skip connection structure. The convolution residual block is used to adjust the size and the channel number of the feature diagram and to prevent a phenomenon of gradient disappearance or gradient explosion caused by that the depth of the generative network is oversized.

The identity residual block in the embodiment includes two three-layered structures, where the two three-layered structures include a first three-layered structure and a second three-layered structure; each of the two three-layered structures include a convolution layer, a batch normalization, and a relu activation function. An input end of the first three-layered structure is connected between the batch normalization of the second three-layered structure and the relu activation function of the second three-layered structure, such which is regarded as a skip connection structure. The identity residual block is used to increase the depth of the generative network, and to prevent a phenomenon of gradient disappearance or gradient explosion caused by that the depth of the generative network is oversized.

The generative network in the embodiment includes a down-sampling structure, an up-sampling structure, and a connection structure for connecting a feature diagram of the down-sampling structure and a feature diagram of the up-sampling structure. The down-sampling structure includes a residual block, which is used for down-sampling. The identity_block shown in FIG. 5 is the structure in FIG. 3; and the cony block shown in FIG. 5 is the structure in FIG. 4.

Figure 6:
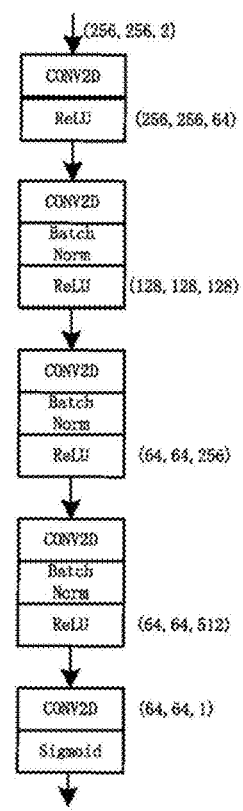
FIG. 6 illustrates a schematic structural diagram of a discrimination network according to an embodiment of the disclosure.

The discrimination network provided in the embodiment includes five convolution layers, and an output of a last convolution layer of the five convolution layers is input into a Sigmoid function to output the discrimination result of the discrimination network. The specific structure thereof is shown in FIG. 6.

The discrimination network in the embodiment includes five convolution layers, three batch normalizations and four relu activation functions, and a last layer of the four relu activation functions outputs a discrimination probability by using the Sigmoid function.

The training samples and training labels are input the generative adversarial network to be trained for 100 rounds to output an intermediate result, and the training process is stopped when the output of the generative network meets the preset condition and a trained network model is saved. The final trained network model has both of the noise elimination and target focusing functions. Therefore, the trained generative adversarial network is completed when the output of the generative network can achieve removing background noise with different intensities and the moving target focusing with different defocused extent.

The training results of the training samples according to the generative adversarial network are shown in FIGS. 7A-7C, FIGS. 8A-8C, FIGS. 9A-9C and FIGS. 10A-10C.

Figure 7A:
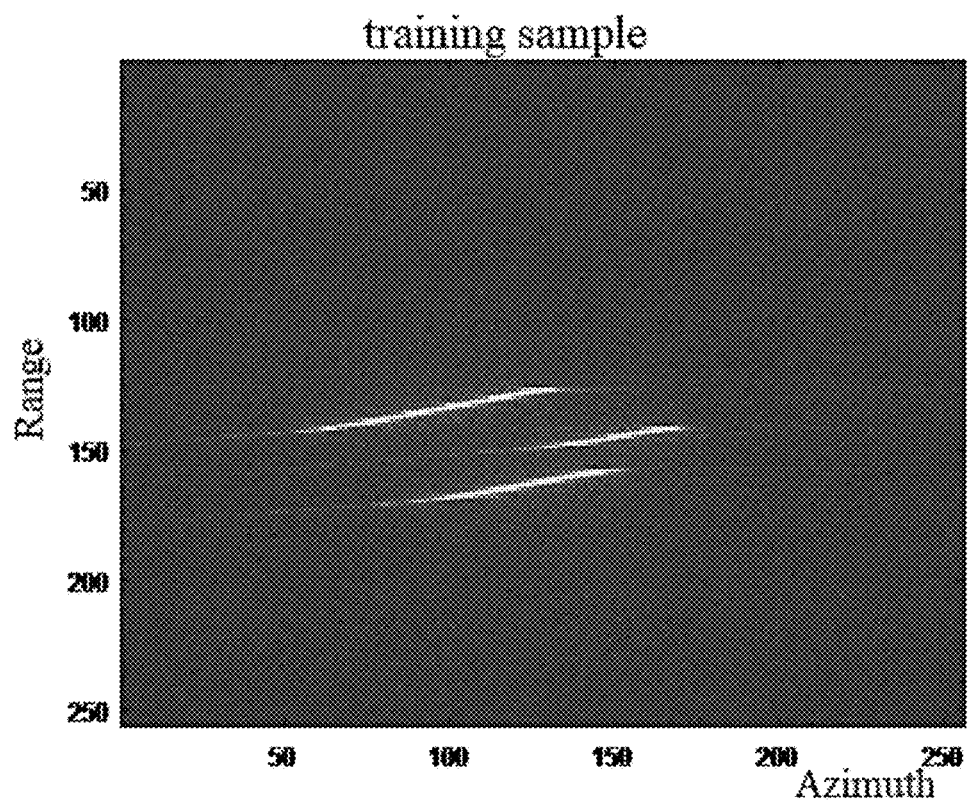
FIGS. 7A-7C show a training sample, a training result and a training label under a SNR (referred to a signal-noise ratio) of 30 dB white Gaussian noise according to an embodiment of the disclosure.
Figure 7B:
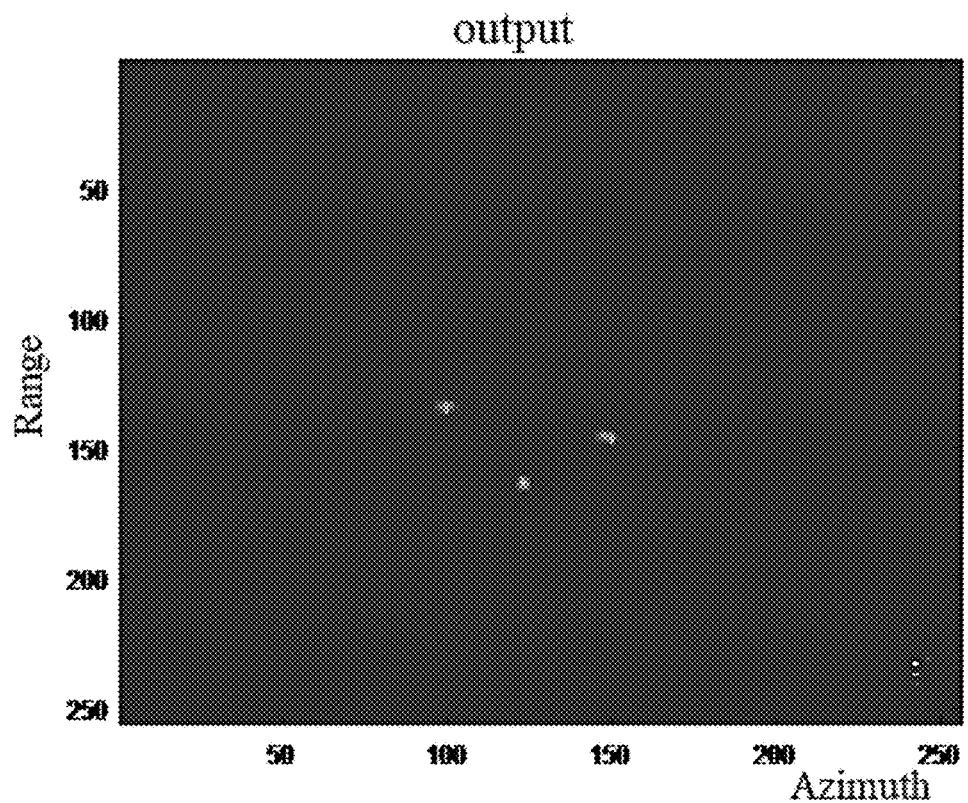
Figure 7C:
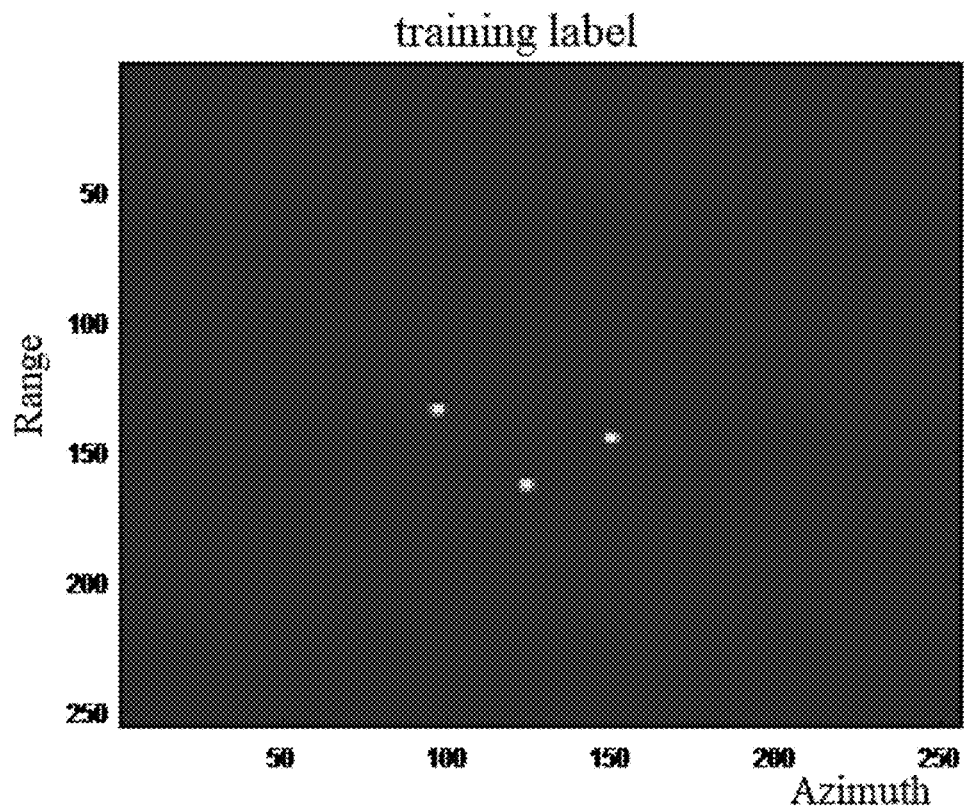

FIG. 7A illustrates the training sample with an addition of the 30 dB white Gaussian noise; FIG. 7B is an output focused image of the generative adversarial network, which is very similar to the training label shown in FIG. 7C. Therefore, the moving targets with different defocused extent are able to be focused through the generative adversarial network, and the noise in the image is also suppressed.

Figure 8A:
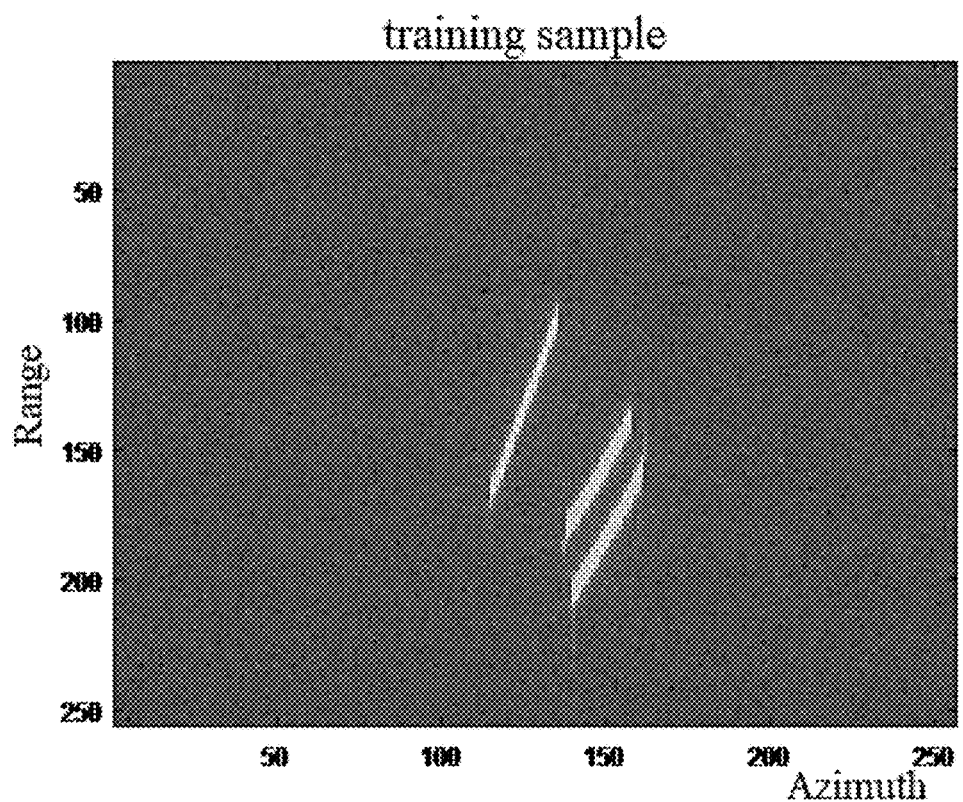
FIGS. 8A-8C show a training sample, a training result and a training label under a SNR of 20 dB white Gaussian noise according to an embodiment of the disclosure.
Figure 8B:
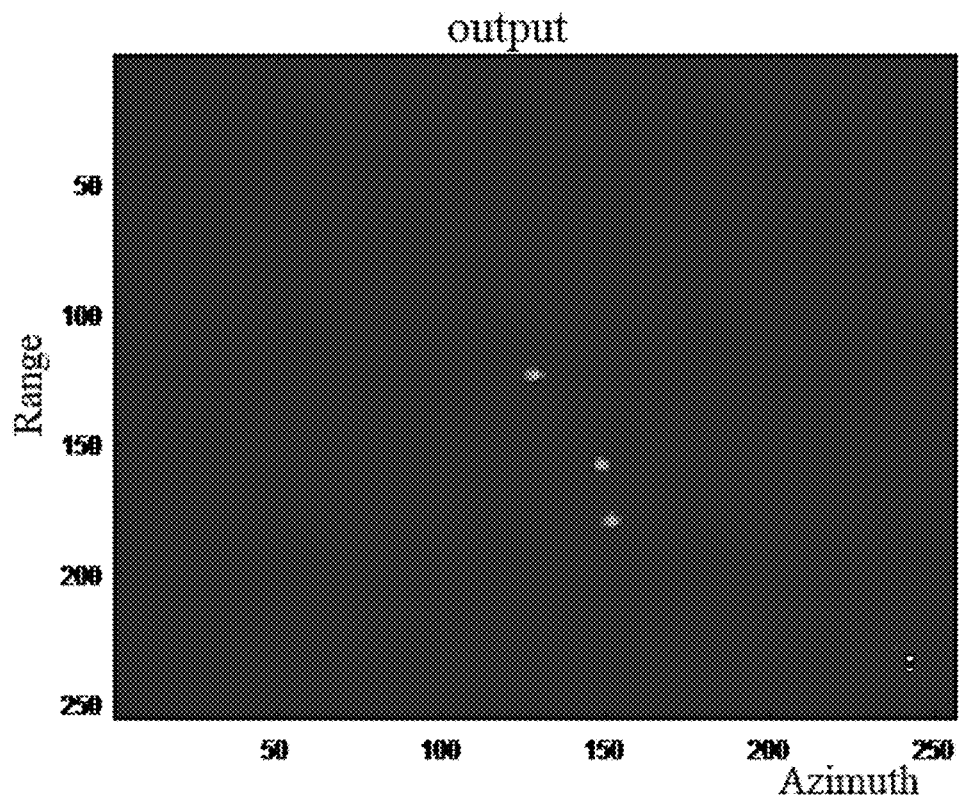
Figure 8C:
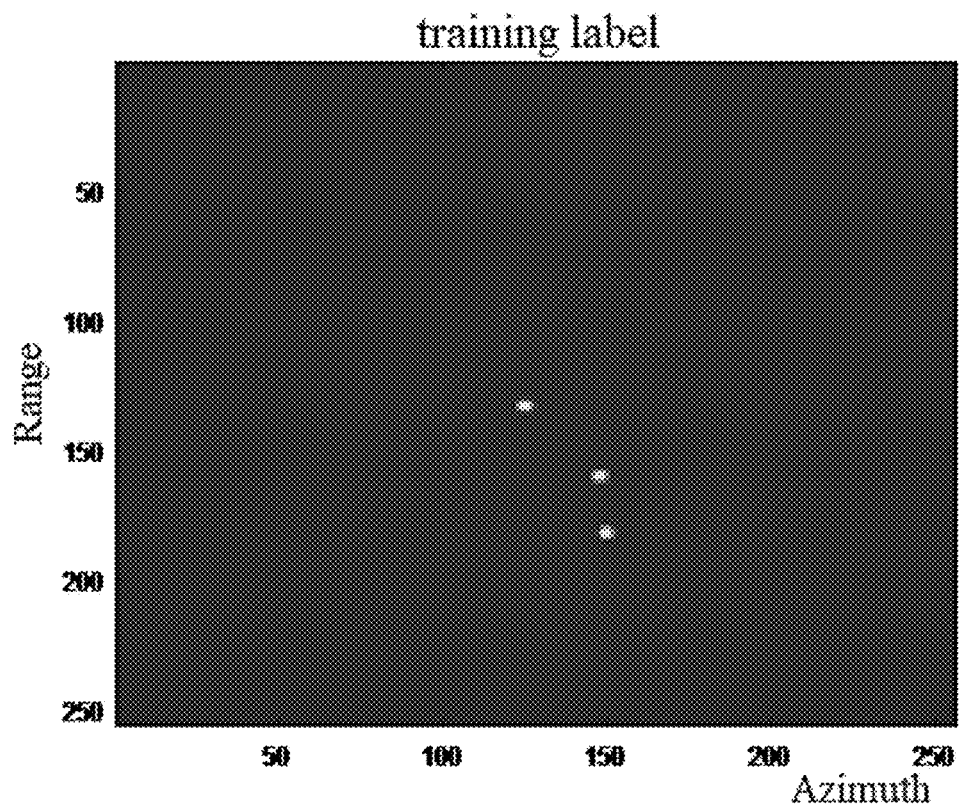

FIG. 8A illustrates the training sample with an addition of the 20 dB white Gaussian noise; FIG. 8B is an output focused image of the generative adversarial network, which is very similar to the training label shown in FIG. 8C. Therefore, the moving targets with different defocused extent are able to be focused through the generative adversarial network, and the noise in the image is suppressed.

Figure 9A:
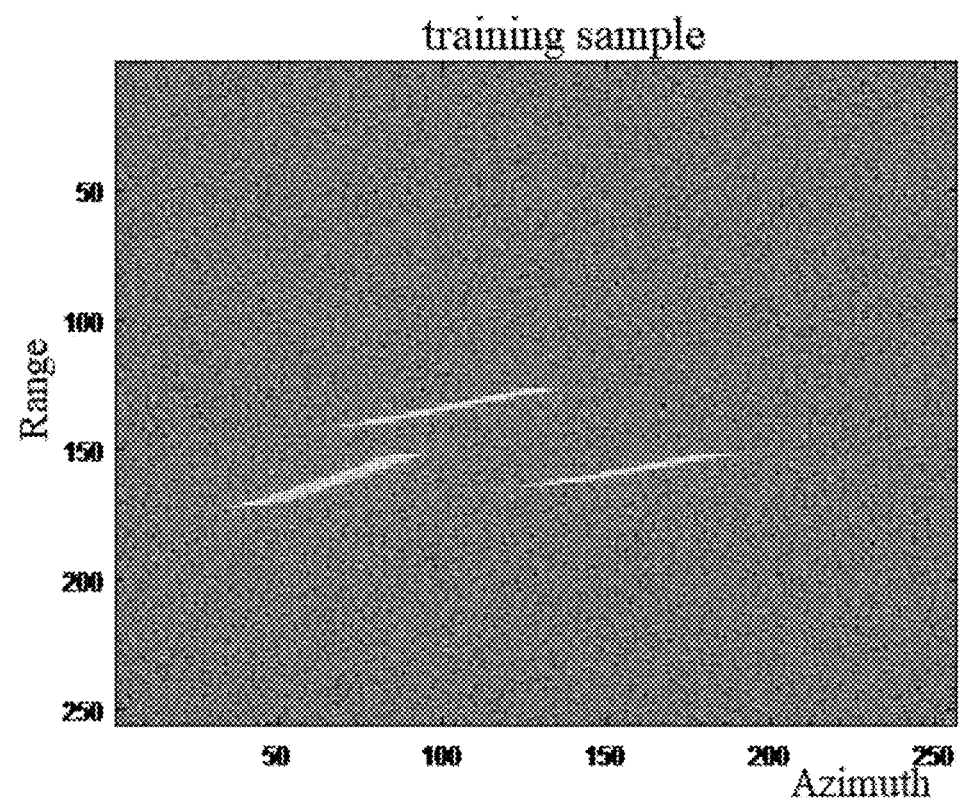
FIGS. 9A-9C show a training sample, a training result and a training label under a SNR of 10 dB white Gaussian noise according to an embodiment of the disclosure.
Figure 9B:
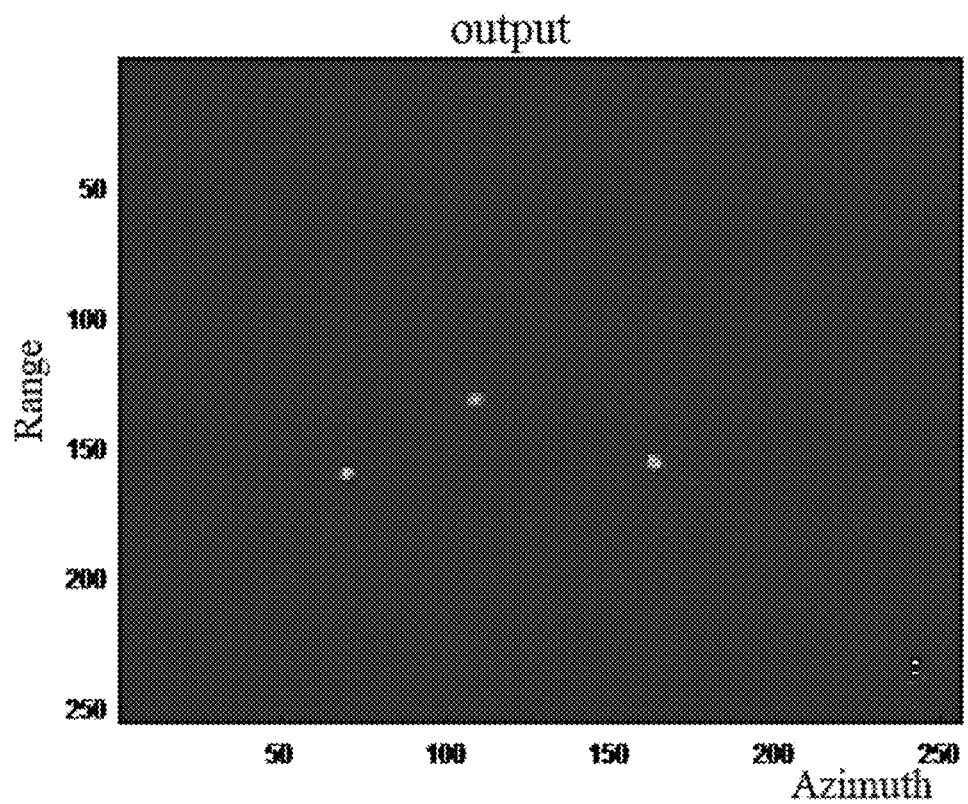
Figure 9C:
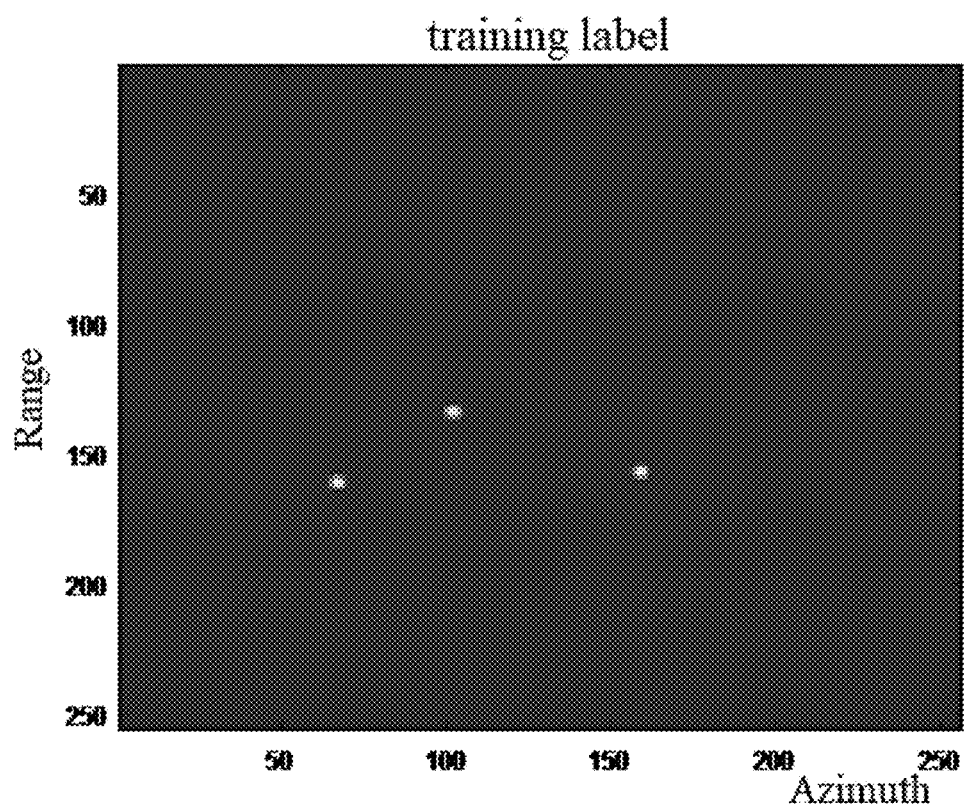

FIG. 9A illustrates the training sample with an addition of the 10 dB white Gaussian noise; FIG. 9B is an output focused image of the generative adversarial network, which is very similar to the training label shown in FIG. 9C. Therefore, the moving targets with different defocused extent are able to be focused through the generative adversarial network, and the noise in the image is suppressed.

Figure 10A:
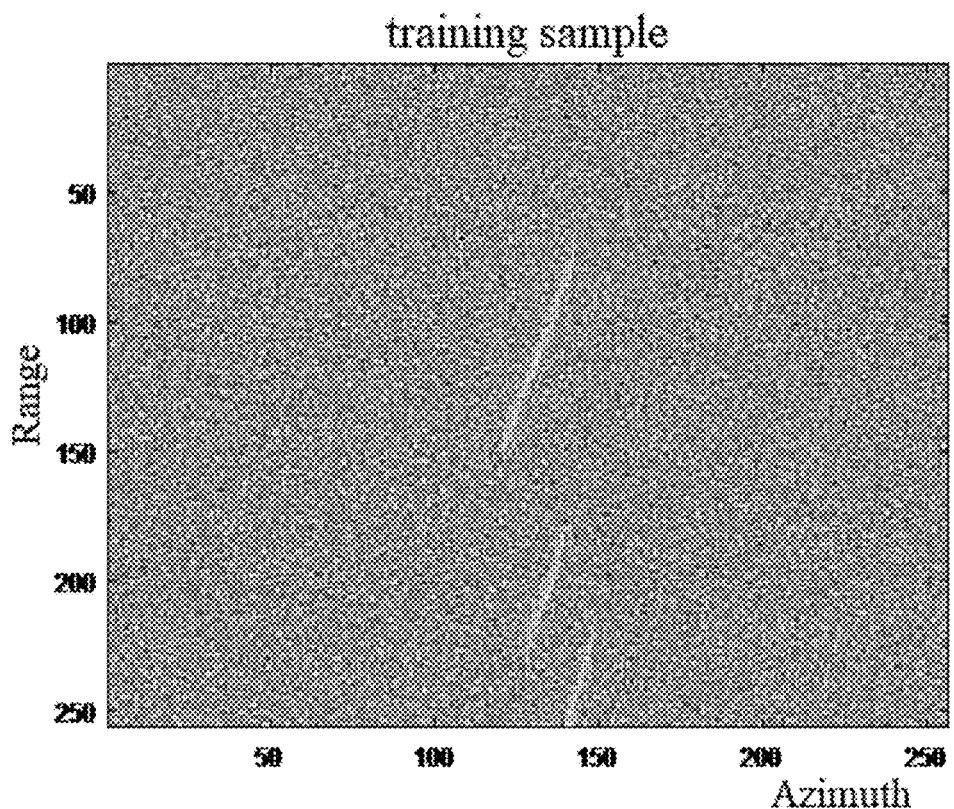
FIGS. 10A-10C show a training sample, a training result and a training label under a SNR of 0 dB white Gaussian noise according to an embodiment of the disclosure.
Figure 10B:
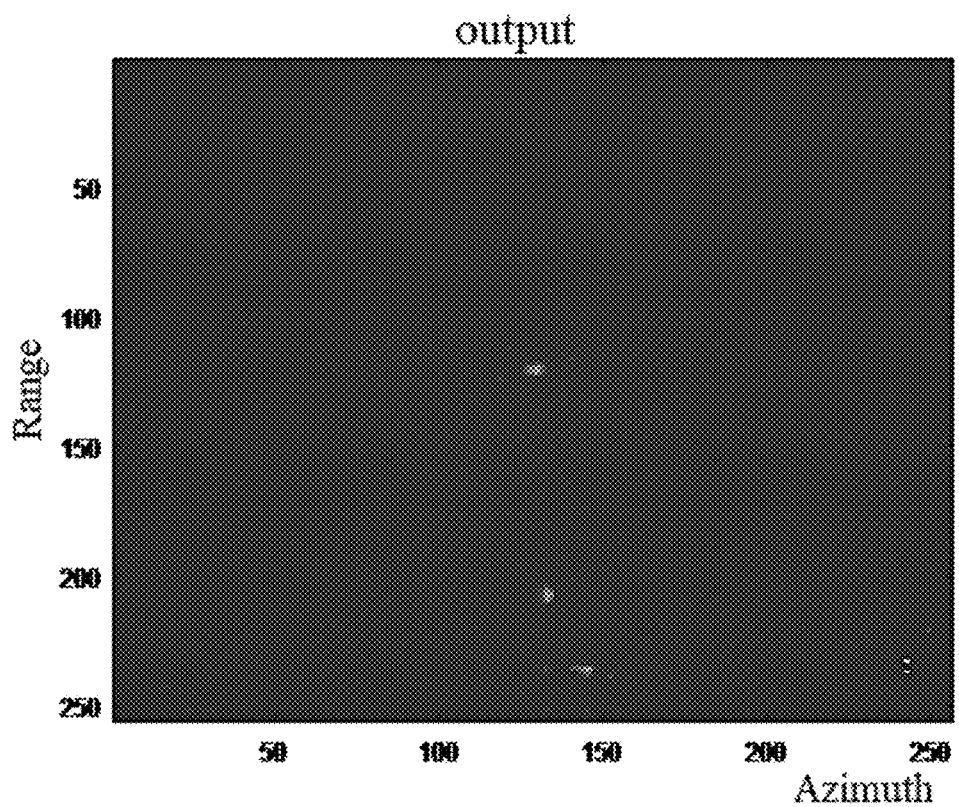
Figure 10C:
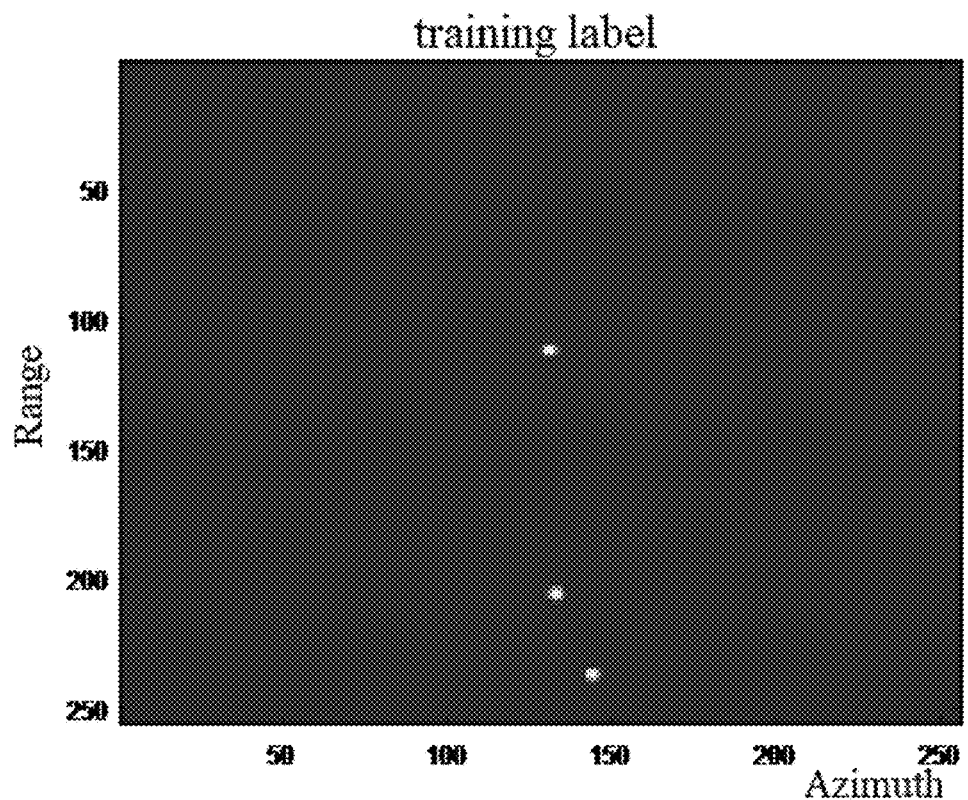

FIG. 10A illustrates the training sample with an addition of the 0 dB of white Gaussian noise; FIG. 10B is an output focused image of the generative adversarial network, which is very similar to the training label shown in FIG. 10C. Therefore, the moving targets with different defocused extent are able to be focused through the generative adversarial network, and the noise in the image is suppressed.

The difference between the testing samples and the training samples, which are provided by the embodiments of the disclosure during a test of the generative adversarial network, is the addition of background noise. The training samples are added with the white Gaussian noise in four determined intensities, and the testing samples are added with the random white Gaussian noise in a range from 0 dB to 30 dB. The trained network model saved from the training process is tested by inputting the testing samples to obtain output focused images and the output focused images are compared with the testing labels.

Figure 11A:
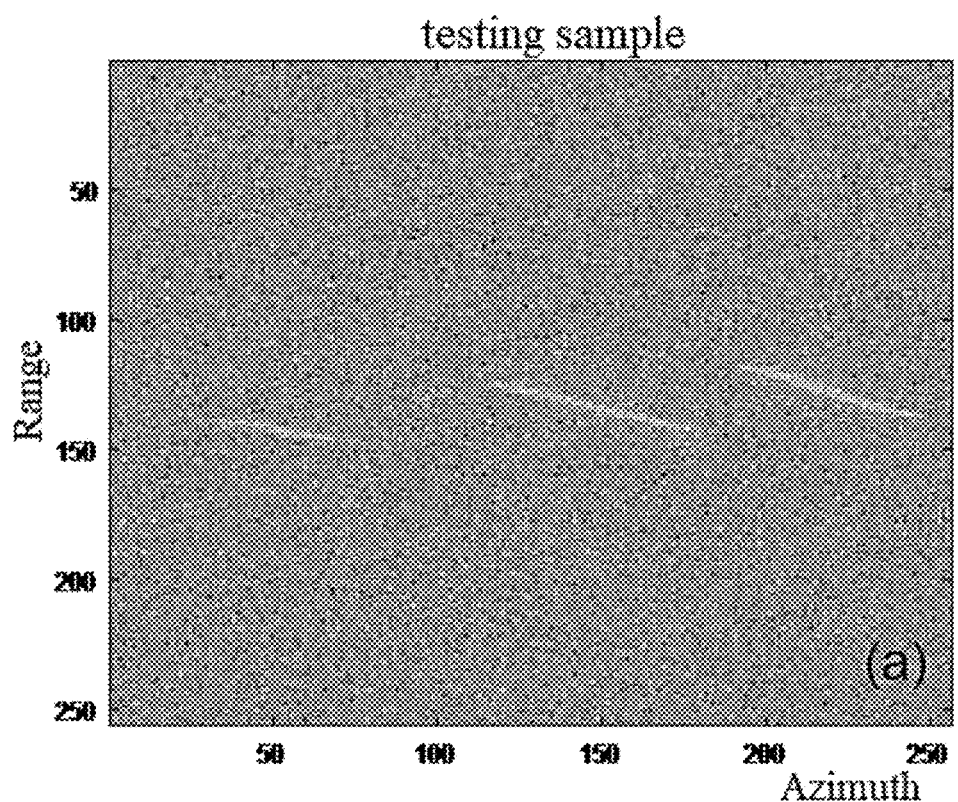
FIGS. 11A-11C show a testing sample, a testing result and a testing label of a trained network model according to an embodiment of the disclosure.
Figure 11B:
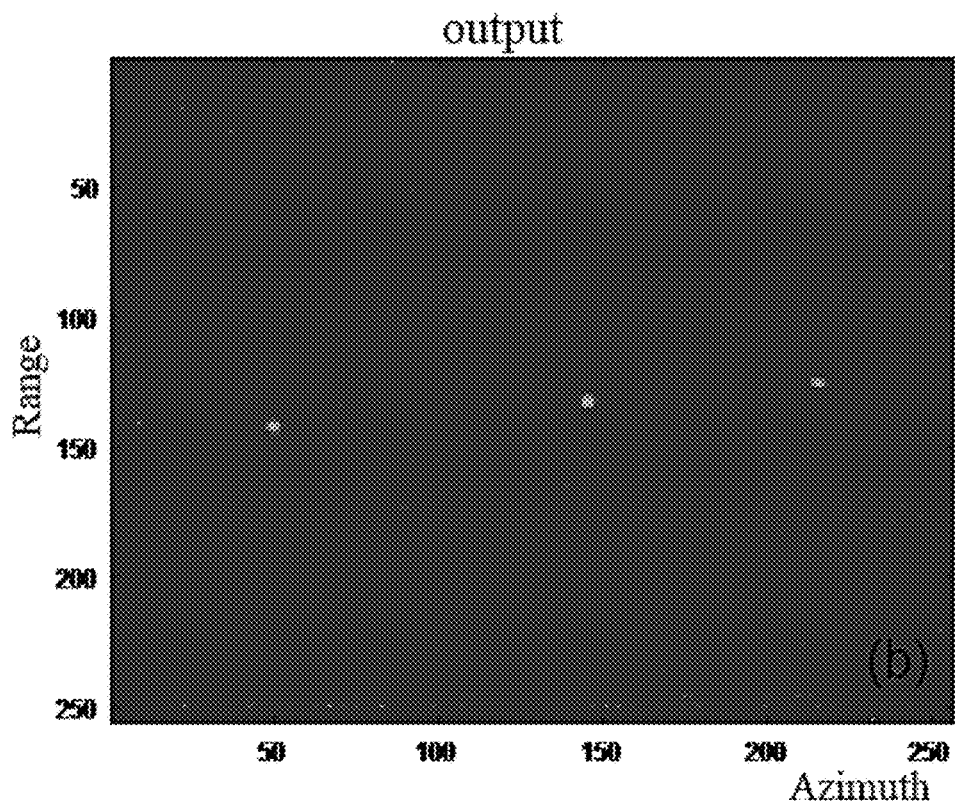
Figure 11C:
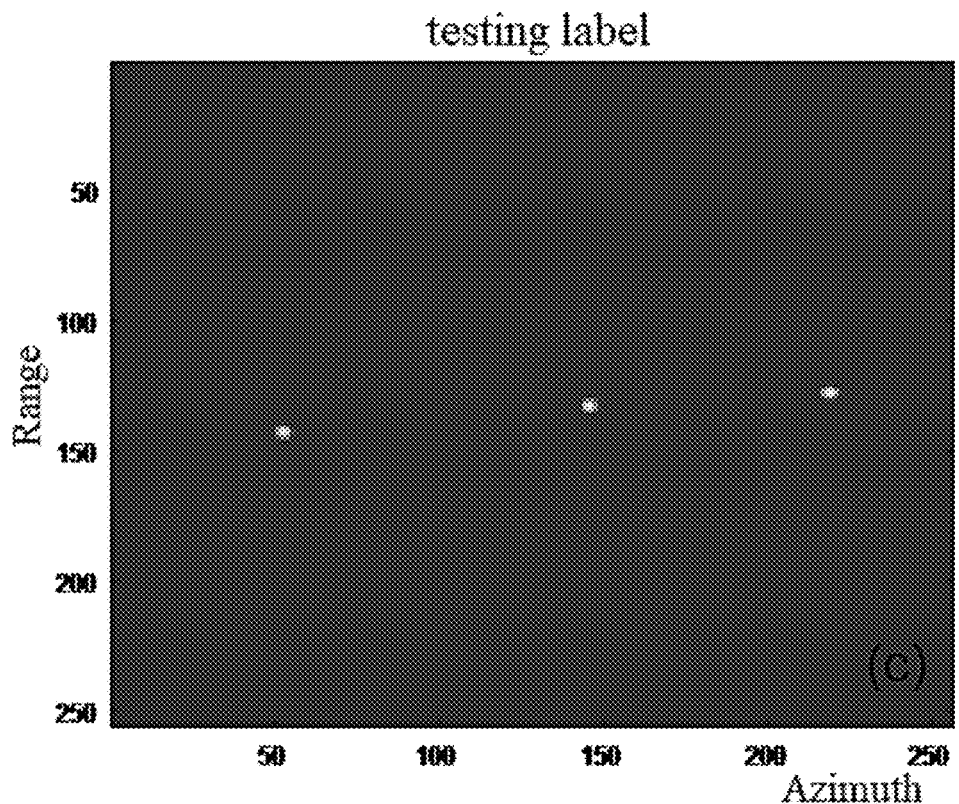
Figure 12A:
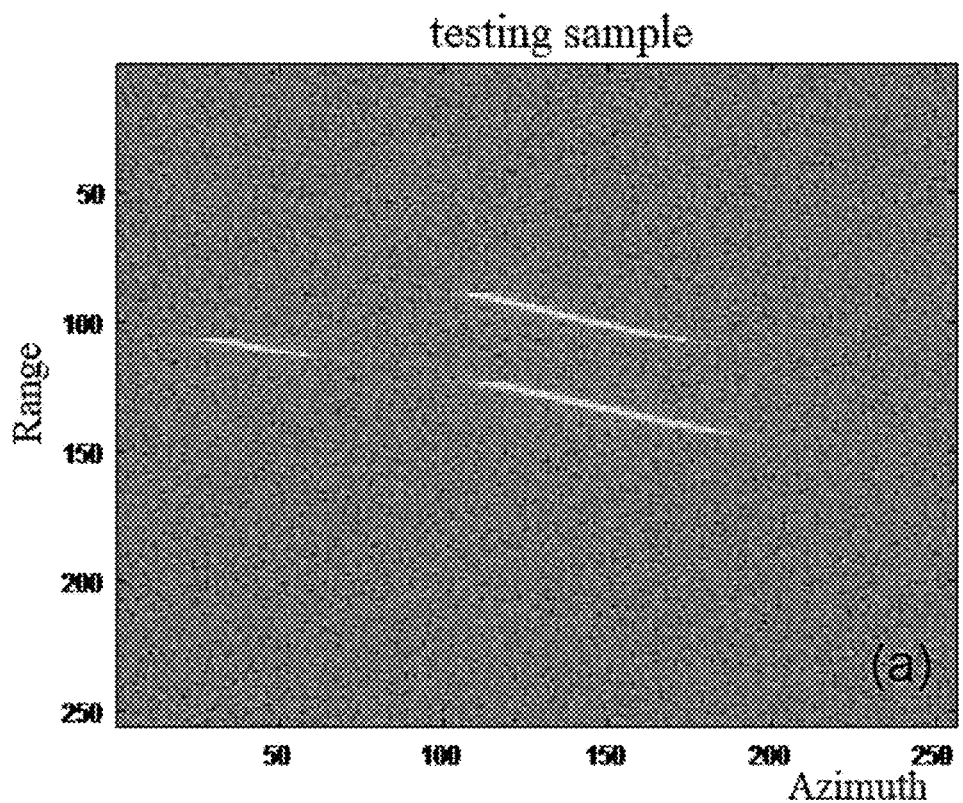
FIGS. 12A-12C show a testing sample, a testing result and a testing label of the trained network model according to another embodiment of the disclosure.
Figure 12B:
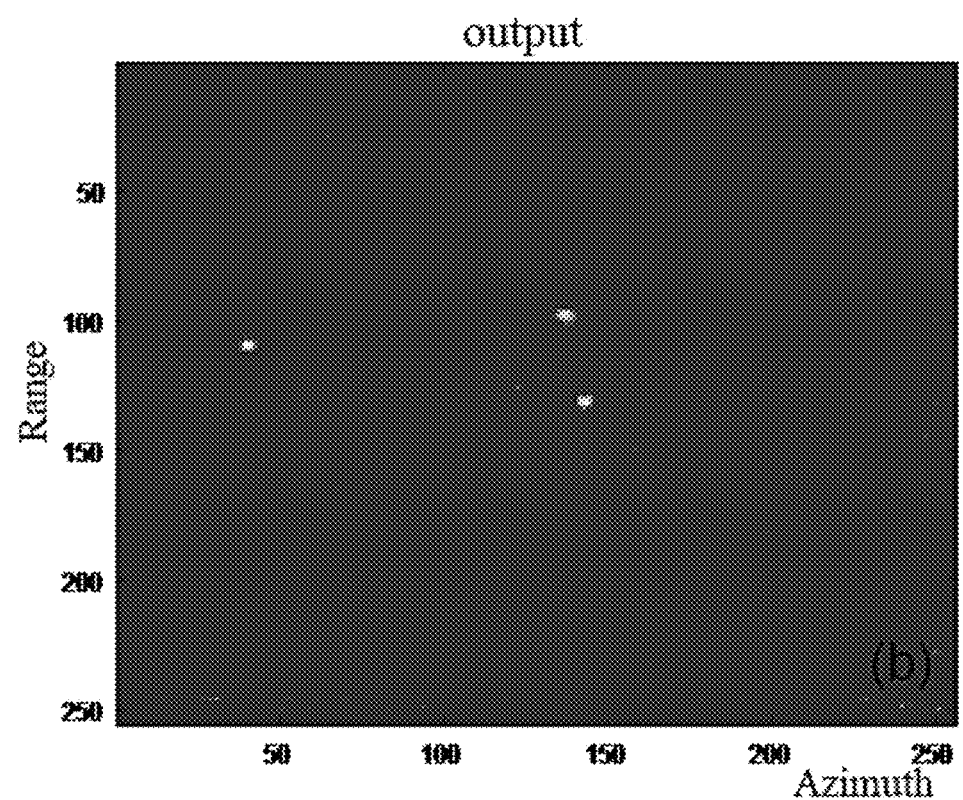
Figure 12C:
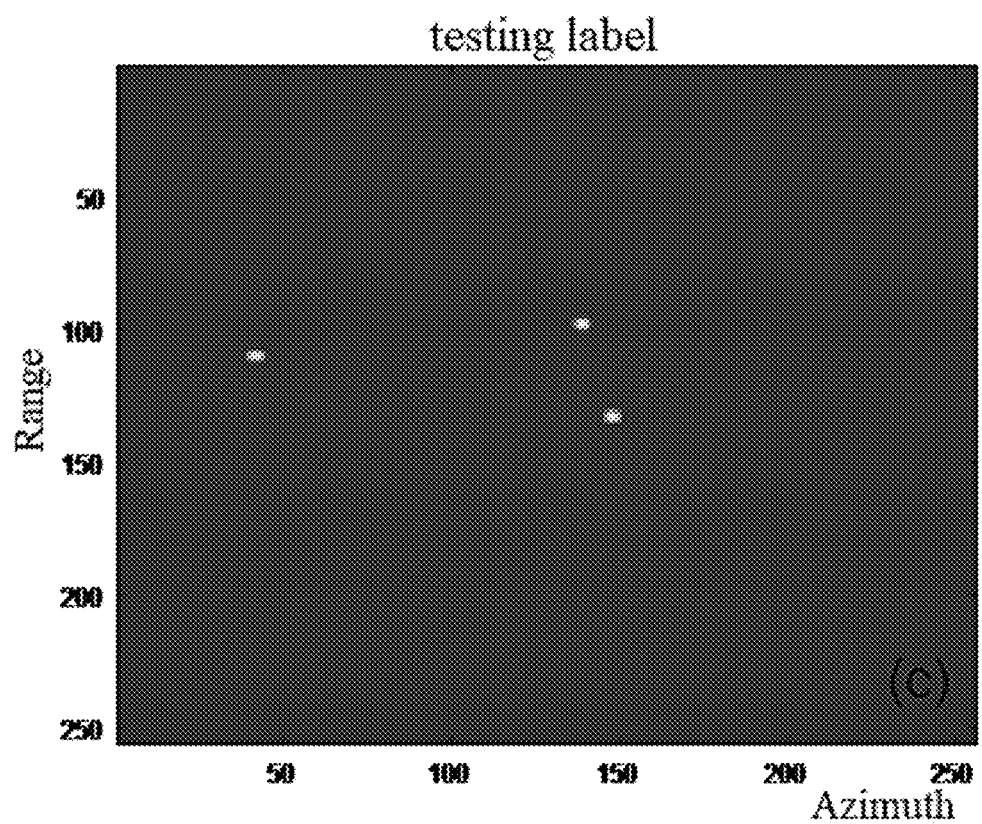

The results of the testing samples are shown in FIGS. 11A-11C and FIGS. 12A-12C. FIG. 11A shows the testing sample; FIG. 11B is the output focused image of the trained network model; FIG. 11C is the testing label. FIG. 12A is the testing sample; FIG. 12B is the focused output image of the trained network model; FIG. 12C is the testing label of the testing sample. Therefore, it can be seen that the trained network model can achieve the background noise elimination and moving target focusing even for the testing samples that have not been encountered in the training process.

When the generated image in the generative network and the corresponding label are together input the discrimination network and the discrimination network determines that the generated image and the corresponding label are a pair of real images, the discrimination result of the discriminant network outputs a probability of 1, which means that the generated image of the generative network has successfully deceived the discrimination network. If the discrimination network determines that the generated image and the corresponding label are not a pair of real images, the discrimination result of the discrimination network outputs a smaller probability. When the discrimination network outputs the smaller probability, the generative network will continuously adjust the parameters of the trained network model in order to improve the probability of the discrimination network to achieve the purpose of faking the real. A function to calculate a loss of the generative adversarial network is divided into two parts, one is to calculate a mean square error between the generated image of the generative network and the label, in order to make the generative network output as close as possible to the label, the loss of this part should be as small as possible. Another part is the output probability of the discrimination network, and the value of this part should be as large as possible. When both parts reach the optimum, it means that the output of the generative network is very close to the label, at this time the background noise should have been eliminated, and the part of the moving targets left should have achieved focusing. Otherwise, the trained network has not reached the optimum and the training process need continue.

The above described embodiments are merely the illustrated embodiments for fully describing the disclosure and the scope of the protection of the disclosure is not limited thereto. Any equivalent substitutions or transformations made by those skilled in the related art on the basis of the disclosure are within the scope of the protection of the disclosure. The scope of the protection of the disclosure is subject to the claims.

What is claimed is:

1. A moving target focusing method based on a generative adversarial network, comprising:
   generating, using a Range Doppler algorithm, a two-dimensional image comprising at least one defocused moving target, as a training sample;
   generating at least one ideal Gaussian point in a position of at least one center of the at least one defocused moving target in the two-dimensional image, to generate a training label, the at least one ideal Gaussian point being corresponding to the at least one defocused moving target one-to-one;
   constructing the generative adversarial network, wherein the generative adversarial network comprises a generative network and a discrimination network;
   inputting the training sample and the training label into the generative adversarial network to perform repeated training until an output of the generative network reaches a preset condition, to thereby obtain a trained network model, comprising:
      inputting the training sample to the generative network, to generate a generated image similar to the training label; and
      inputting the generated image and the training label into the discrimination network, to obtain a discrimination result, and returning the discrimination result to the generative network; and
   inputting a testing sample into the trained network model, to output a moving target focused image;
   wherein the discrimination network is a multi-layered convolution network;
   wherein the generative network is a Unet network based on a residual structure; the residual structure comprises a convolution residual block and an identity residual block; the convolution residual block is configured to adjust a size and a channel number of a feature diagram; and the identity residual block is configured to increase a depth of the generative network;
   wherein the convolution residual block comprises three three-layered structures; the three three-layered structures comprise a first three-layered structure, a second three-layered structure, and a third three-layered structure stacked in sequence, each of the three three-layered structures comprises a convolution layer, a batch normalization and an activation function stacked in sequence; the convolution residual block further comprises a two-layered structure, the two-layered structure comprises a convolution layer and a batch normalization stacked in sequence; an input end of the convolution layer of the two-layered structure is connected to an input end of the first three-layered structure, and an output end of the batch normalization of the two-layered structure is connected between the batch normalization of the third three-layered structure and the activation function of the third three-layered structure; and the convolution residual block is configured to prevent one of gradient disappearance and gradient explosion caused by that the depth of the generative network is oversized;
   wherein the identity residual block comprises two three-layered structures, the two three-layered structures comprise a first three-layered structure and a second three-layered structure stacked in sequence, each of the two three-layered structure comprises a convolution layer, a batch normalization, and an activation function; an input end of the first three-layered structure is connected between the batch normalization of the second three-layered structure and the activation function of the second three-layered structure; and the identity residual block is configured to prevent one of gradient disappearance and gradient explosion caused by that the depth of the generative network is oversized;
   wherein the generative network comprises a down-sampling structure, an up-sampling structure, and a connection structure for connecting a feature diagram of the down-sampling structure and a feature diagram of the up-sampling structure; and the down-sampling structure comprises a residual block, and the residual block is configured for down-sampling; and wherein the discrimination network comprises five convolution layers, three batch normalizations and four rectified linear unit (relu) activation functions, and an output of a last convolution layer of the five convolution layers is input into a Sigmoid function.

2. The moving target focusing method based on a generative adversarial network according to claim 1, wherein the training label is a noiseless image with the at least one ideal Gaussian point.

3. A moving target focusing system based on a generative adversarial network, comprising:
   a memory;
   a processor; and
   a computer program stored on the memory and executable by the processor;
   wherein the processor is configured to implement the moving target focusing method according to claim 1 upon executing the computer program.

* * * * *